Patented Oct. 20, 1936

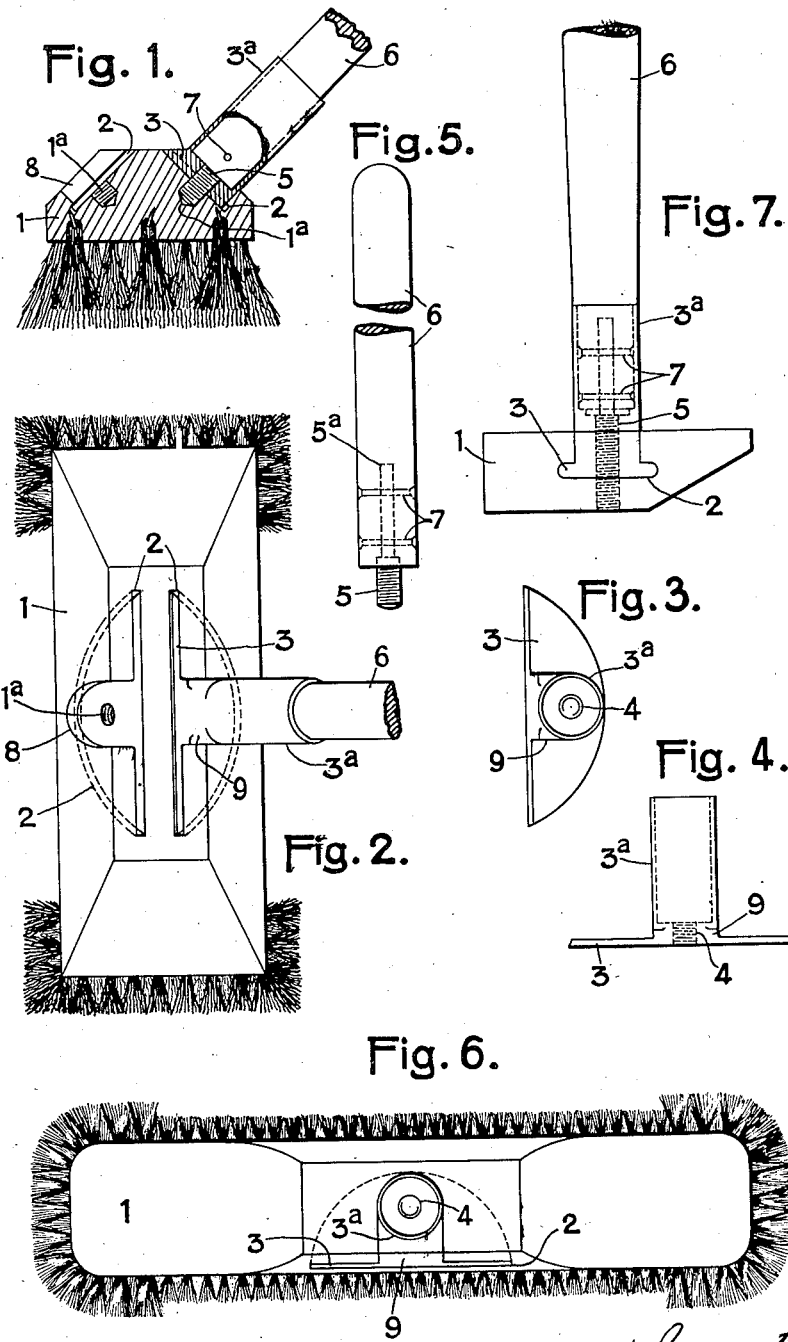

2,057,914

UNITED STATES PATENT OFFICE 2,057,914

HANDLE FASTENING DEVICE

Max Plön, Basel, Switzerland

Application December 3, 1935, Serial No. 52,715
In Switzerland December 7, 1934

6 Claims. (Cl. 306—30)

The problem of attaching the handle to the body of an implement, as for example a scrubber, a broom, a tool, an agricultural implement, and so forth has not hitherto been solved in a completely satisfactory manner, because the devices known hitherto did not afford the desired degree of security; principally because the stress during use of the implement always acted upon the fastening part and thus loosening of the handle or its auxiliary devices necessarily occurred.

Devices have already become known in which a handle socket is provided with a plate slidable into the body of the implement, to give the handle a deeper seating and thereby a better hold. Here also however, only a conditional solution is provided because once again the handle had to be secured in the socket by nails, screws, or pressure. The plate on the socket also needed additional securing means as screws, clamps, and so forth to be made fast to the implement body, which afforded a further possibility of loosening.

The present invention relates to a device which overcomes all these disadvantages by the three implement parts, the body, handle socket with plate, and handle with screw, being secured together into an intimate unyielding whole by means of the handle and screw. It is characterized by the screw secured to the handle and serving as the sole fastening means, not only effecting the connection of the handle with the implement body but also, passing through the holding plate, securing the latter in its seat in the implement body against sliding out. By this construction the shock, pull and blow action is prevented from acting solely through the point of attachment.

The holding plate of the member forming the connection between the implement body and the handle can be so formed that it lies sunk in a recess in the implement body and completely fills the recess. An intimate connection of the connecting member with the implement body is thereby provided over a broad seating surface and the stress during work must take effect primarily on the implement body itself.

The unyielding connection of the three parts of the implement is effected by the handle and screw being screwed into the socket of the connecting member and through the holding plate into the implement body. This renders unnecessary a separate fastening of the holding plate to the implement body and of the handle to the socket. Further convenient exchange of the parts is rendered possible.

Some examples embodying the present invention are illustrated in the accompanying drawing.

Figures 1 and 2 show in section and plan a first embodiment applied to a scrubber, while Figures 3, 4 and 5 illustrate details thereof.

Figure 6 shows a second embodiment applied to a broom.

Figure 7 relates to a further embodiment.

The implement body 1 (Figures 1 and 2), in this case a scrubber, has on both sides a slot 2 machined into its body; into one of these two slots is sunk a metal plate 3 which is provided with a handle socket 3ª. The handle 6 is entered into the socket 3ª. At the entering end the handle 6 is provided with a screw 5 extending longitudinally of the handle axis. The plate has a through, tapped hole 4 which serves to receive the screw 5 of the handle 6. A flattened shank part 5ª which is let into the handle end and there firmly attached to the handle by cross rivets 7 serves to secure the screw 5 to the handle 6. The handle socket 3ª is accommodated in a recess 8 in the implement body. The plate 3 is provided at the junction with the socket with a thickening 9 which fits exactly in the corresponding part of the recess 8 and is provided to prevent rotation of the plate 3 during screwing of the handle 6 into the implement body and during use.

Further the implement body is provided with a tapped hole 1ª axially of the handle, and the screw 5 made of such length that in fixing the handle it can be screwed through the tapped hole 4 of the plate 3 and into the tapped hole 1ª in the implement body 1, in order to secure the plate 3 in the body 1 and to unite the whole into a rigid structure. During manipulation of the implement all forces are directly transmitted to the implement body itself. The place of attachment is more or less relieved of load, and loosening of the handle is practically excluded. When the scrubber is worn on one side the handle can be transferred to the other side. The second slot 2 with a corresponding recess 8 and tapped hole 1ª are provided for this reason.

The handle fastening for a broom as shown in Figure 6 is effected in a similar manner, but with the difference that here only one slot 2 for the securing plate 3 needs to be provided and it lies parallel to the back surface of the implement body, as the handle stands not inclined as before, but perpendicular to the cleaning surface.

As can be seen in the drawing, the plate 3 is segmental in form and the slot 2 is machined in the implement body of corresponding segmental form. Thus with easy working of the slot 2 a good broad seat for the plate 3 therein is obtained.

In the embodiment of Figure 7 which relates to a hammer haft fastening, the base plate 3 on the haft socket 3ª is fitted into a corresponding notch 2 in the hammer head 1. The screw 5 in the haft 6 is here also screwed through the plate 3 into the hammer head 1 and as single fastening means effects fastening of the haft to the hammer head and the securing of the plate 3 therein against sliding out.

What I claim is:—

1. A device for securing a handle to an implement body comprising an implement body having a slot therein, a holding plate fitting in said slot and having a handle socket, a handle and means upon said handle securing said handle to said implement body and at the same time fixedly securing said holding plate to said implement body.

2. A device for securing a handle to an implement body comprising an implement body having a slot therein, a holding plate fitting in said slot and having a handle socket, a handle and a threaded member upon said handle securing said handle to said implement body and at the same time fixedly securing said holding plate to said implement body.

3. A device for securing a handle to an implement body comprising an implement body having a slot therein, a holding plate having a handle socket integral therewith located in said slot, said implement body and said holding plate having alined apertures, a handle and means upon said handle cooperating with said alined apertures for securing said handle to said implement body and at the same time fixedly securing said holding plate to said implement body.

4. A device for securing a handle to an implement body comprising an implement body having a slot therein, a holding plate having a handle socket integral therewith located in said slot, said implement body and said holding plate having threaded alined apertures, a handle and a screw upon said handle cooperating with said alined apertures for securing said handle to said implement body and at the same time fixedly securing said holding plate to said implement body.

5. A device for securing a handle to an implement body comprising an implement body having a slot therein and a recess communicating with said slot, a holding plate fitting in said slot, a handle socket integral with said plate extending through said recess, said socket and said recess being of such configuration as to prevent rotation of said holding plate in said slot, a handle and means upon said handle securing said handle to said implement body and at the same time fixedly securing said holding plate to said implement body.

6. A device for securing a handle to an implement body comprising an implement body having a slot therein and a recess communicating with said slot, a holding plate fitting in said slot, a handle socket integral with said plate extending through said recess, said socket and said recess being of such configuration as to prevent rotation of said holding plate in said slot, said holding plate and said implement body having alined threaded apertures, a handle and a screw upon said handle cooperating with said alined apertures for securing said handle to said implement body and at the same time fixedly securing said holding plate to said implement body.

MAX PLÖN.